United States Patent
Li (10) Patent No.: US 10,492,045 B2
(45) Date of Patent: Nov. 26, 2019

(54) DYNAMIC PROVISIONING OF DEVICE CONFIGURATION FILES FOR ELECTRONIC SUBSCRIBER IDENTITY MODULES

(71) Applicant: Apple Inc., Cupertino, CA (US)

(72) Inventor: Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/691,660

(22) Filed: Aug. 30, 2017

(65) Prior Publication Data

US 2018/0063668 A1 Mar. 1, 2018

Related U.S. Application Data

(60) Provisional application No. 62/382,225, filed on Aug. 31, 2016.

(51) Int. Cl.
| | |
|---|---|
| *H04W 4/00* | (2018.01) |
| *H04W 4/50* | (2018.01) |
| *H04W 8/24* | (2009.01) |
| *H04L 9/32* | (2006.01) |
| *H04L 9/06* | (2006.01) |
| *H04L 9/14* | (2006.01) |
| *H04W 12/04* | (2009.01) |
| *H04W 12/06* | (2009.01) |
| *H04W 12/10* | (2009.01) |
| *H04W 4/60* | (2018.01) |

(52) U.S. Cl.
CPC .............. *H04W 4/50* (2018.02); *H04L 9/0643* (2013.01); *H04L 9/14* (2013.01); *H04L 9/3247* (2013.01); *H04W 4/60* (2018.02); *H04W 8/245* (2013.01); *H04W 12/04* (2013.01); *H04W 12/06* (2013.01); *H04W 12/10* (2013.01); *H04L 2209/80* (2013.01)

(58) Field of Classification Search
CPC ....... H04W 4/001; H04W 8/245; H04W 4/50; H04W 12/04; H04W 12/06; H04W 12/10; H04W 4/60; H04L 9/3247; H04L 9/14; H04L 9/0643; H04L 2209/80
USPC ..................................... 455/435.1
See application file for complete search history.

(56) References Cited

U.S. PATENT DOCUMENTS

| | | | |
|---|---|---|---|
| 9,419,970 B2* | 8/2016 | Haggerty | H04L 63/0272 |
| 2014/0143534 A1* | 5/2014 | Chastain | H04L 63/0428 |
| | | | 713/150 |
| 2017/0289788 A1* | 10/2017 | Lalwaney | H04L 41/0803 |

* cited by examiner

*Primary Examiner* — Huy C Ho
(74) *Attorney, Agent, or Firm* — Dickinson Wright RLLP (57) ABSTRACT

Representative embodiments described herein set forth techniques for provisioning device configuration files and electronic Subscriber Identity Modules (eSIMs) to mobile devices. One embodiment sets forth a method for installing an eSIM at a mobile device. According to some embodiments, the method includes the steps of (1) receiving a first request to obtain the eSIM, (2) issuing, to an eSIM server, a second request for the eSIM, (3) receiving an eSIM installation package from the eSIM server, where the eSIM installation package includes (i) the eSIM, and (ii) a device configuration file that corresponds to: the mobile device, and at least one Mobile Network Operator (MNO) associated with the eSIM, and (4) upon verifying at least one digital signature associated with the eSIM installation package: installing the device configuration file on the mobile device, and installing the eSIM on an electronic Universal Integrated Circuit Card (eUICC) included in the mobile device.

20 Claims, 7 Drawing Sheets

DYNAMIC PROVISIONING OF DEVICE CONFIGURATION FILES FOR ELECTRONIC SUBSCRIBER IDENTITY MODULES

CROSS-REFERENCE TO RELATED APPLICATIONS

The present application claims the benefit of U.S. Provisional Application No. 62/382,225, entitled "DYNAMIC PROVISIONING OF DEVICE CONFIGURATION FILES FOR ELECTRONIC SUBSCRIBER IDENTITY MODULES," filed Aug. 31, 2016, the content of which is incorporated herein by reference in its entirety for all purposes.

FIELD

The described embodiments set forth techniques for provisioning device configuration files and electronic Subscriber Identity Modules (eSIMs) to mobile devices.

BACKGROUND

Many mobile devices are configured to utilize Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile—also referred to herein as a Subscriber Identity Module (SIM)—that a mobile device can utilize to register and interact with an MNO. Typically, a UICC takes the form of a small removable card (commonly referred to as a SIM card) that is configured to be inserted into a UICC-receiving bay included in a mobile device. In more recent implementations, however, UICCs are being embedded directly into system boards of mobile devices. These electronic/embedded UICCs (eUICCs) can provide advantages over traditional SIM cards, e.g., an eUICC can store a number of MNO profiles—referred to herein as electronic Subscriber Identity Modules (eSIMs)—and can eliminate the need to include UICC-receiving bays in mobile devices.

In some cases, a mobile device can be configured to utilize a device configuration file in conjunction with operating an eSIM so that the mobile device can effectively operate with an MNO associated with the eSIM. The device configuration file can include, for example, properties used for establishing a connection with the MNO, user interface (UI)-related information to display at the mobile device (e.g., a carrier name associated with the MNO), and the like. In some cases, it can be a requirement for a mobile device to be pre-loaded with at least one device configuration file in order for the mobile device to operate with at least one MNO out of the box, e.g., when the mobile device is purchased/powered-on by a customer for the first time and undergoes an initialization process. Unfortunately, in some cases, a mobile device is manufactured before device configuration files are finalized, e.g., for MNOs with which the mobile device is expected to operate. One attempt to help alleviate this issue involves installing "placeholder" device configuration files on the mobile devices during their manufacture, where the placeholder device configuration files include hooks for updating. However, this approach can introduce issues during the initialization of the mobile devices as the placeholder device configuration files often have not been thoroughly tested and are prone to error. Moreover, using the hooks to update the placeholder device configuration files can require performing a complete operating system (OS) update of the mobile device. Consequently, the efficiency/quality of the initialization process is substantially degraded, which can lead to frustration among users and inoperable conditions.

SUMMARY

Representative embodiments described herein set forth techniques for provisioning device configuration files and electronic Subscriber Identity Modules (eSIMs) to mobile devices.

One embodiment sets forth a method for installing an eSIM at a mobile device. According to some embodiments, the method is carried out at the mobile device, and includes the steps of (1) receiving a first request to obtain the eSIM, (2) issuing, to an eSIM server, a second request for the eSIM, (3) receiving an eSIM installation package from the eSIM server, where the eSIM installation package includes (i) the eSIM, and (ii) a device configuration file that corresponds to: the mobile device, and at least one Mobile Network Operator (MNO) associated with the eSIM, and (4) upon verifying at least one digital signature associated with the eSIM installation package: installing the device configuration file on the mobile device, and installing the eSIM on an electronic Universal Integrated Circuit Card (eUICC) included in the mobile device.

Another embodiment sets forth a method for providing an eSIM to a mobile device. According to some embodiments, the method is carried out at an eSIM server, and includes the steps of (1) receiving, from the mobile device, a request for the eSIM, (2) obtaining, based on the request, a device configuration file that corresponds to: the mobile device, and at least one MNO associated with the eSIM, (3) obtaining, based on the request, the eSIM for the mobile device, (4) generating an eSIM installation package that includes (i) the eSIM, and (ii) the device configuration file for the mobile device, (5) generating a digital signature for the eSIM installation package, and (6) providing the eSIM installation package to the mobile device.

Additional embodiments include a non-transitory computer readable storage medium configured to store instructions that, when executed by a processor included in a computing device, cause the computing device to carry out any of the above-described methods. Additional embodiments include a computing device that includes a processor configured to cause the computing device to carry out any of the above-described methods.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments described herein set forth techniques for provisioning device configuration files and electronic Subscriber Identity Modules (eSIMs) to mobile devices. According to some embodiments, the techniques described herein can involve mobile devices, electronic Universal Integrated Circuit Cards (eUICCs) included in mobile devices, eSIM servers, and Original Equipment Manufacturer (OEM) servers that are configured to interact with one another to implement the techniques. For example, according to some embodiments, a mobile device can be configured to identify an initialization condition (e.g., a first power-on out of the box), and, in response to the initialization condition, interface with an eSIM server to obtain an eSIM installation package that includes (i) a device configuration file, and (ii) an eSIM. According to some embodiments, the device configuration file can originate from an OEM server and include, for example, properties used by the mobile device to establish a connection with an MNO to which the device configuration file corresponds. Alternatively, the device configuration file can be configured to include properties specific to the mobile device/eSIMs utilized by the mobile device, such that the device configuration file is not tied to a particular MNO. According to some embodiments, the eSIM can include applets that, when implemented by the eUICC/a baseband processor included in the mobile device, can enable the mobile device to operate with the MNO. Upon receipt of the eSIM installation package, the mobile device can install both the device configuration file and the eSIM to enable the mobile device to consume services provided by the MNO.

Accordingly, the techniques described herein provide mechanisms for provisioning device configuration files and eSIMs to mobile devices. A more detailed discussion of these techniques is set forth below and described in conjunction with FIGS. 1-7, which illustrate detailed diagrams of systems and methods that can be used to implement these techniques.

Figure 1:
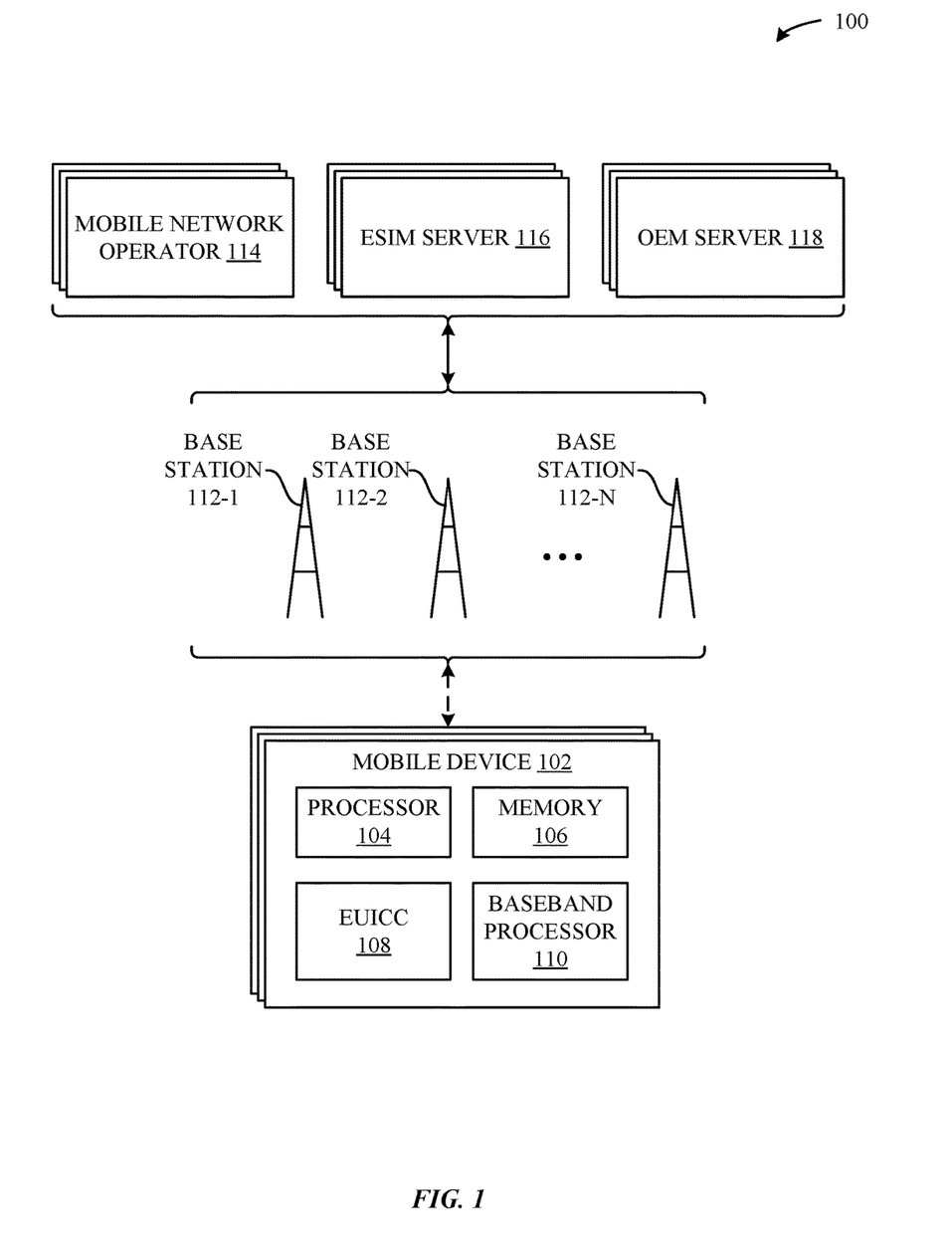
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes mobile devices 102 and a group of base stations 112 associated with one or more MNOs 114. According the illustration of FIG. 1, each mobile device 102 can represent a mobile computing device (e.g., an iPhone® by Apple®, an iPad® by Apple®, etc.), and the base stations 112 can represent different radio towers that enable the mobile devices 102 and MNOs 114 to communicate with one another. According to some embodiments, the MNOs 114 can represent different wireless service providers that provide specific services (e.g., voice and data) to which the mobile devices 102 can subscribe. As also shown in FIG. 1, the system 100 can also include eSIM servers 116 that can implement services for selecting and preparing device configuration files/eSIMs for delivery to the mobile devices 102. Moreover, the system 100 can include Original Equipment Manufacturer (OEM) servers 118 that can implement services for providing/delivering the device configuration files to the eSIM servers 116/mobile devices 102. It is noted that it is not a requirement for the mobile devices 102 to communicate with the MNOs 114, eSIM servers 116, and OEM servers 118 through the base stations 112. On the contrary, any means for communicating—e.g., a wireless connection (e.g., a WiFi connection, etc.), a wired connection (e.g., an Ethernet connection, a tethered connection, etc.), etc.—over any network—e.g., a local area network, a wide area network, etc.—can be utilized.

As shown in FIG. 1, each mobile device 102 can include a processor 104, a memory 106, an eUICC 108, and a baseband processor 110. According to some embodiments, these components can work in conjunction to enable the mobile devices 102 to provide useful features to users, e.g., localized computing, location-based services, voice communications, Internet connectivity, and so on. According to some embodiments, the eUICC 108 can represent an embedded/electronic Universal Integrated Circuit Card. As described in greater detail below, the eUICC 108 can be configured to store electronic Subscriber Identity Modules (eSIMs) for accessing the different MNOs 114 through the base stations 112. For example, the eUICC 108 of a mobile device 102 can be configured to store an eSIM for each MNO 114 to which the mobile device 102 is subscribed. Although not illustrated in FIG. 1, a mobile device 102 can also be configured to include a receiving bay for a removable UICC that manages one or more physical SIM cards. Moreover, and as described herein, the eUICC 108 can work in conjunction with the mobile device 102 to manage/load device configuration files in conjunction with managing/loading eSIMs to enable the mobile device 102 to access services provided by the MNOs 114.

It is noted that the embodiments described herein are not limited only to utilizing embedded/electronic Universal Integrated Circuit Cards (e.g., the eUICC 108). On the contrary, physical/removable SIM cards can be used in place of/in addition to the eUICC 108. For example, a physical/removable SIM card that conforms to any form factor standard (e.g., 2FF, 3FF, 4FF, etc.) can be utilized when implementing the embodiments described herein.

Figure 2:
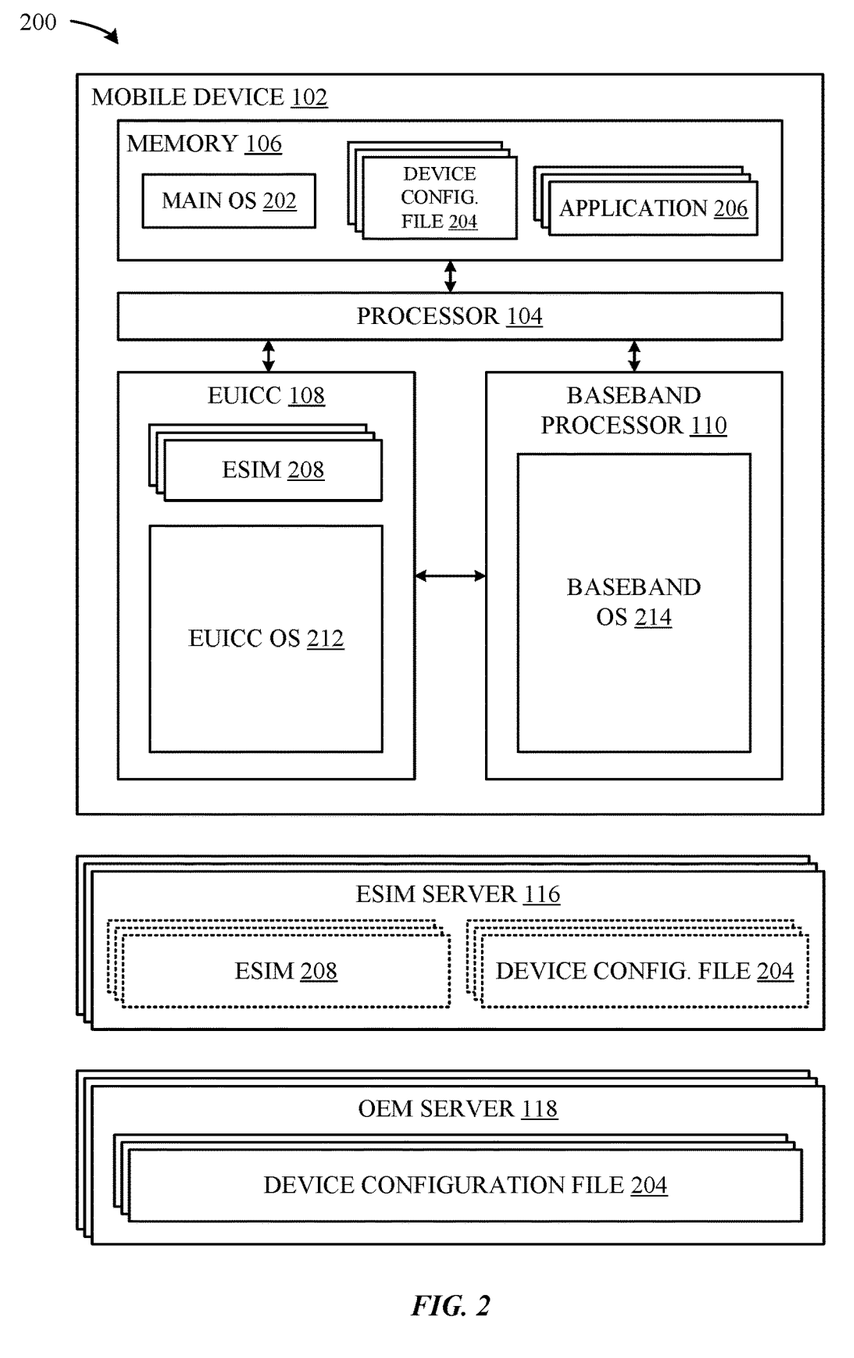
FIG. 2 illustrates a block diagram of a more detailed view of particular components of the system of FIG. 1, according to some embodiments.

FIG. 2 illustrates a block diagram of a more detailed view 200 of particular components of a mobile device 102 of FIG. 1, according to some embodiments. As shown in FIG. 2, the processor 104, in conjunction with the memory 106, can implement a main operating system (OS) 202 that is configured to execute applications 206 (e.g., native OS applications and user applications). As also shown in FIG. 2, the memory 106 can include device configuration files 204 that are accessible to the main OS 202. According to some embodiments, a device configuration file 204 can include, for example, properties used by the mobile device 102 to establish a connection with an MNO 114 to which the device configuration file 204 corresponds (e.g., Access Point Names (APNs) for Global System for Mobile Communication (GSM) networks, Packet Data Protocols (PDPs), etc.), user interface (UI)-related information to display at the mobile device 102 (e.g., a carrier name associated with the MNO 114), and the like. The device configuration file 204 can further include configuration information for the processor 104, the baseband processor 110, and other components included in the mobile device 102. It is noted that these examples are not an exhaustive list of what a device configuration file 204 can include, and that device configuration file 204 can include any information relevant to operating with eSIMs 208/MNOs 114.

As shown in FIG. 2, the eUICC 108 can implement an eUICC OS 212 that is configured to manage the hardware resources of the eUICC 108 (e.g., a processor and a memory (not illustrated in FIG. 2)). According to some embodiments, the eUICC 108 can be configured to manage eSIMs 208 that can be obtained via the techniques described herein. According to some embodiments, the eUICC OS 212 can be configured to activate the eSIMs 208 within the eUICC 108 and provide the baseband processor 110 with access to the eSIMs 208. Although not illustrated in FIG. 2, each eSIM 208 can be associated with a unique identifier (ID) and can include multiple applets that define the manner in which the eSIM 208 operates. For example, one or more of the applets, when implemented by the baseband processor 110 and the eUICC 108, can enable the mobile device 102 to communicate with an MNO 114 and provide useful features to a user of the mobile device 102. For example, an eSIM 208—in conjunction with a device configuration file 204—can enable the mobile device 102 to establish a connection with an MNO 114 and consume services provided by the MNO 114.

As also shown in FIG. 2, the baseband processor 110 of the mobile device 102 can include a baseband OS 214 that is configured to manage the hardware resources of the baseband processor 110 (e.g., a processor, a memory, different radio components, etc.). According to one embodiment, the baseband processor 110/baseband OS 214 can implement a manager (not illustrated in FIG. 2) that is configured to interface with the eUICC 108. The manager also can be configured to implement various services, e.g., a collection of software modules that are instantiated by way of the various applets of activated eSIMs that are managed by the eUICC 108. For example, the services can be configured to manage the different connections that exist between the mobile device 102 and the MNOs 114 according to the different eSIMs 208/device configuration files 204 that are activated.

Further shown in FIG. 2 is a more detailed breakdown of an eSIM server 116. According to some embodiments, and as shown in FIG. 2, the eSIM server 116 can be configured to manage eSIMs 208 for distribution to the mobile devices 102. According to some embodiments, the eSIM server 116 can be also be configured to interface with other servers that manage digital repositories (not illustrated in FIG. 2) in which eSIMs 208 are managed/included. For example, the eSIM server 116 can be configured to issue requests to the digital repositories for eSIMs 208, and then provide the eSIMs 208 to the mobile devices 102. Alternatively, the eSIM server 116 can be configured to issue requests to the digital repositories for eSIMs 208, and then provide information to the mobile devices 102 for how to access the eSIMs 208 directly from the digital repositories, which can help increase efficiency through load balancing.

As also shown in FIG. 2, the eSIM server 116 can be configured to manage device configuration files 204 for distribution to the mobile devices 102. According to some embodiments, the eSIM server 116 can be also be configured to interface with the OEM servers 118 to obtain device configuration files 204 for the mobile devices 102 in conjunction with providing eSIMs 208 to the mobile devices 102. For example, the eSIM server 116 can be configured to cache a collection of device configuration files 204 provided by OEM servers 118, and periodically query the OEM servers 118 for updates, if any, to the device configuration files 204 included in the collection of device configuration files 204. Moreover, the eSIM server 116 can be configured to issue requests to the OEM servers 118 for device configuration files 204, and then direct the mobile devices 102 to interface with the OEM servers 118 to obtain the device configuration files 204 directly from the OEM servers 118, which can help increase efficiency through load balancing.

It is noted that the above-described architectures/relationships between the mobile devices 102, eSIM servers 116, and OEM servers 118 are exemplary and do not represent an exhaustive breakdown of potential interactions. For example, according to some embodiments, it is not a requirement for the eSIM servers 116 to interact with the OEM servers 118 on behalf of the mobile devices 102. Instead, the mobile devices 102 can be configured to separately interface with the eSIM servers 116 and the OEM servers 118 to obtain the eSIMs 208/device configuration files 204, respectively, to implement the techniques described herein.

Figure 3:
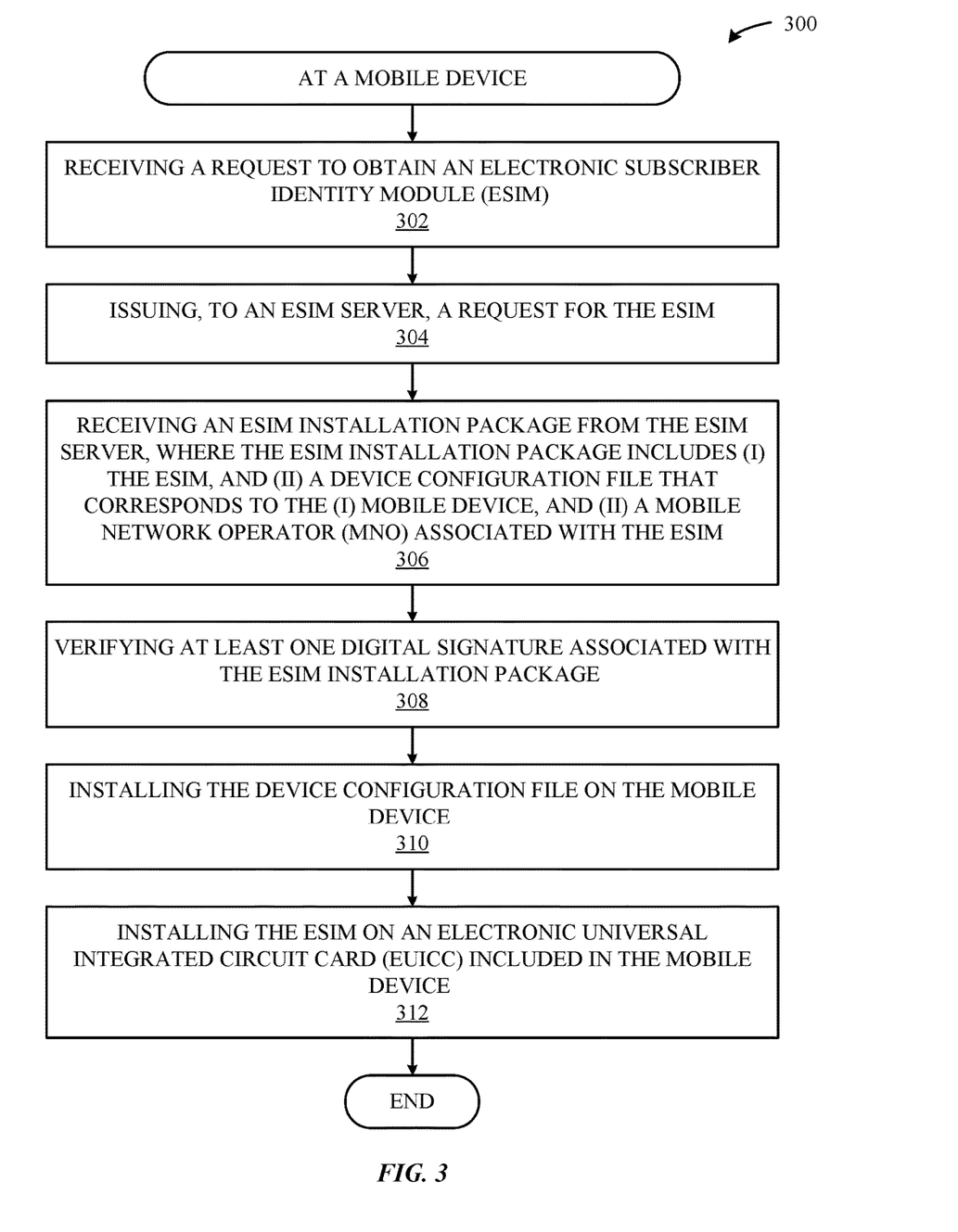
FIG. 3 illustrates a method for installing an eSIM at a mobile device, according to some embodiments.

FIG. 3 illustrates a method 300 for installing an eSIM (e.g., an eSIM 208) at a mobile device (e.g., a mobile device 102), according to some embodiments. As shown in FIG. 3, the method 300 begins at step 302, and involves the main OS 202 of the mobile device 102 receiving a request to obtain the eSIM 208. This request can be issued, for example, in response to the mobile device 102 being purchased/powered-on by a customer for the first time and undergoing an initialization process. At step 304, in response to the request received at step 302, the main OS 202 issues, to an eSIM server (e.g., the eSIM server 116), a request for the eSIM 208. According to some embodiments, the request can include information about the mobile device 102, e.g., an International Mobile Equipment Identity (IMEI) number (including Type Allocation (TAC) information) associated with the mobile device 102, device type information associated with the mobile device 102, information input by a user of the mobile device 102, information associated with the main OS 202 executing on the mobile device 102, and the like. According to some embodiments, the request can also include information associated with the eSIM 208 that is being requested, e.g., a type of eSIM 208 that is being requested, an MNO 114 associated with the eSIM 208, and the like.

At step 306, the main OS 202 receives an eSIM installation package from the eSIM server 116, where the eSIM installation package includes (i) the eSIM 208, and (ii) a device configuration file 204 that corresponds to (i) the mobile device 102, and (ii) an MNO 114 associated with the eSIM 208. As previously described herein, the device configuration file 204 can include properties used by the mobile device 102 to establish a connection with the MNO 114 to which the device configuration file 204 corresponds (e.g., Access Point Names (APNs) for Global System for Mobile Communication (GSM) networks, Packet Data Protocols (PDPs), etc.), user interface (UI)-related information to display at the mobile device 102 (e.g., a carrier name associated with the MNO 114), and the like. According to some embodiments, the device configuration file 204 can include digital signatures produced by different entities involved with the techniques described herein, e.g., eSIM servers 116, OEM servers 118, and so on. Moreover, the device configuration file 204 can be encrypted using various techniques, e.g., symmetric key cryptography, asymmetric key cryptography, and the like. For example, the device configuration file 204 can be encrypted using a public key that is specific to the mobile device 102/eUICC 108 so that only the mobile device 102—which possesses the private key counterpart to the public key—is able to decrypt the device configuration file 204, thereby increasing security. A more detailed description of these techniques is provided below in conjunction with step 308 of FIG. 3.

At step 308, the main OS 202 verifies at least one digital signature associated with the eSIM installation package. According to some embodiments, the eSIM installation package can include various digital signatures for elements residing at different hierarchical levels within the eSIM installation package. For example, the eSIM installation package itself can be associated with a digital signature that corresponds to a hash of the eSIM installation package, where the digital signature is established by way of a private key possessed by the eSIM server 116. In this example, the mobile device 102 can access a public key counterpart to the private key (possessed by the eSIM server 116) to verify the digital signature, with the understanding that the mobile device 102 trusts the public key counterpart. For example, the mobile device 102 can be pre-loaded with the public key counterpart in a protected area of memory, the mobile device 102 can interact with a Certificate Authority to verify the authenticity/identify of the eSIM server 116, and so on. In this manner, the mobile device 102 can reliably confirm that the eSIM installation package itself—which includes the eSIM 208 and the device configuration file 204—is authentic and has not been compromised.

Additionally, the eSIM 208 itself can be associated with a digital signature that corresponds to a hash of the eSIM 208, thereby enabling the mobile device to carry out an additional verification to ensure that the eSIM 208 is authentic/and has not been compromised. In this example, the same private key described above in association with the eSIM installation package can be used by the eSIM server 116 to produce the digital signature for the eSIM 208, and/or a supplemental public/private key pair can be used. Moreover, the device configuration file 204 can be associated with a digital signature that corresponds to a hash of the device configuration file 204. In this example, a private key possessed by an OEM server 118 associated with the mobile device 102 can be used to establish the digital signature. For example, the OEM server 118 can digitally sign various device configuration files 204 and provide them to the eSIM servers 116 for storage/distribution. Moreover, the OEM server 118 can dynamically generate and digitally sign device configuration files 204 on demand as they are requested by the eSIM servers 116/mobile devices 102. In this example, the mobile devices 102/eSIM servers 116 can be configured to trust the public key counterpart to the private key associated with the OEM server 118 so that they can reliably authenticate the device configuration files 204.

It is noted that the above examples are exemplary and that any number of digital signatures corresponding to any number of hashes of the eSIM installation package/individual elements included in the eSIM installation package can be utilized. Moreover, the mobile devices 102, eSIM servers 116, and OEM servers 118 can be configured to pre-store/pre-trust public keys for verifying digital signatures between one another, work with CAs to verify the digital signatures, and so on.

At step 310, the main OS 202 installs the device configuration file 204 on the mobile device 102. This can involve, for example, adding the device configuration file 204 to a collection of device configuration files 204 managed by the mobile device 102. It is noted that the device configuration files 204 can be stored in a protected area of memory within the mobile device 102 as an effort to prevent malicious users from accessing/modifying the device configuration files 204. At step 312, the main OS 202 installs the eSIM 208 on an eUICC (e.g., the eUICC 108) included in the mobile device 102. In turn, the mobile device 102 can activate both the device configuration file 204 and the eSIM 208 and access wireless services provided by the MNO 114.

Figure 4:
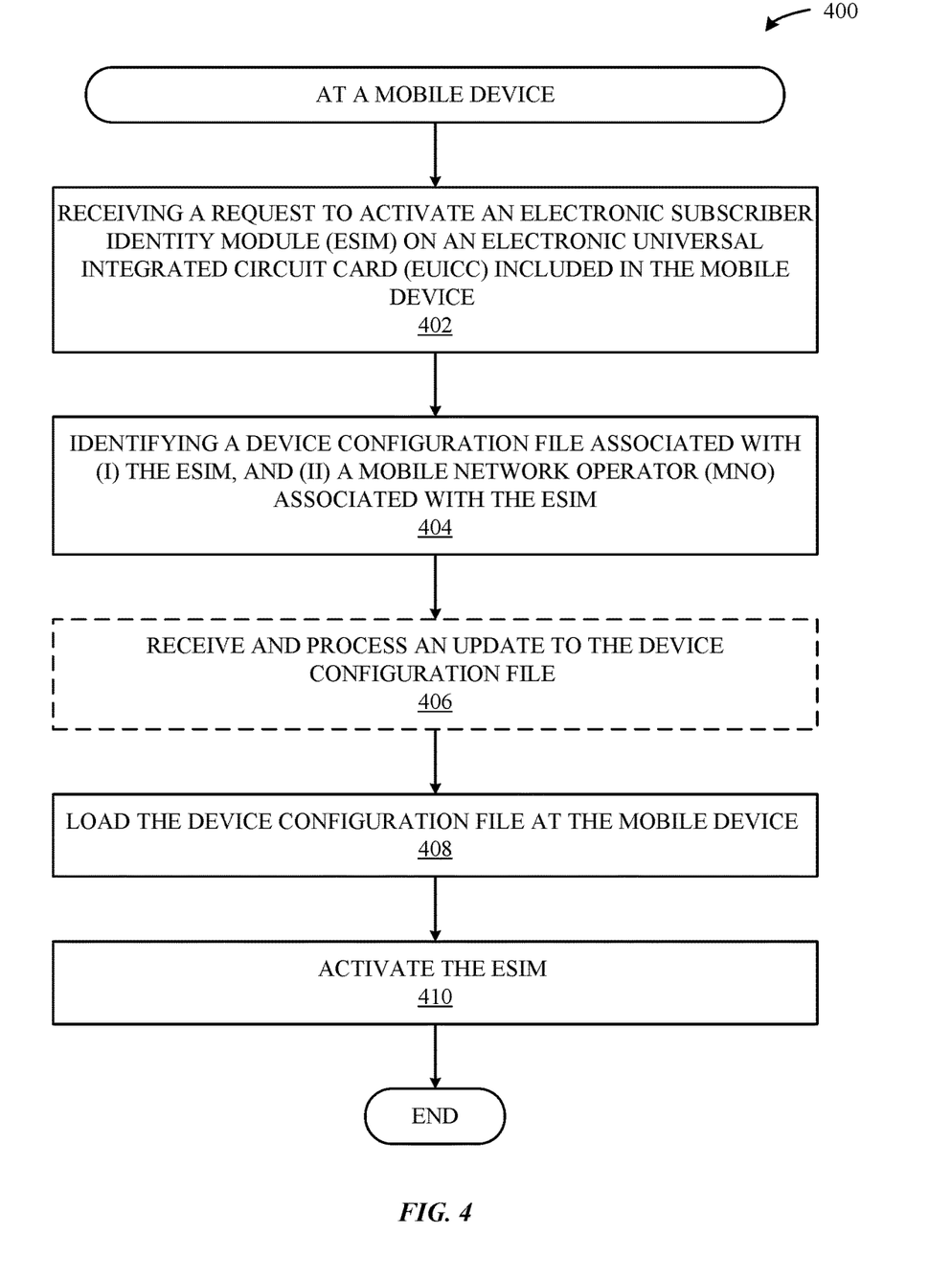
FIG. 4 illustrates a method for activating an eSIM at a mobile device, according to some embodiments.

FIG. 4 illustrates a method 400 for activating an eSIM (e.g., an eSIM 208) at a mobile device (e.g., a mobile device 102), according to some embodiments. As shown in FIG. 4, the method 400 begins at step 402, and involves the main OS 202 of the mobile device 102 receiving a request to activate the eSIM on an eUICC (e.g., the eUICC 108) included in the mobile device 102. This request can originate, for example, in response to a power-up of the device, a selection to connect to a particular MNO 114, and so on. At step 404, the main OS 202 identifies a device configuration file 204 associated with (i) the eSIM 208, and (ii) an MNO 114 associated with the eSIM 208. At optional step 406, the main OS 202 receives and processes an update to the device configuration file 204. Optional step 406 can occur, for example, when the mobile device 102 is configured to periodically interface with the eSIM servers 116/OEM servers 118 to determine whether an update to the device configuration file 204 is available. When such an update is available, the mobile device 102 can seamlessly download the updated device configuration file 204 and install the device configuration file 204 on the mobile device 102 in accordance with the techniques described herein. According to some embodiments, the mobile device 102 can be configured to prompt a user to determine whether to check for/install an update to one or more device configuration files 204 when available.

At step 408, the main OS 202 loads the device configuration file 204 at the mobile device 102. This can involve, for example, updating a configuration of the mobile device 102 to properly operate with the MNO 114/eSIM 208. For example, a UI of the mobile device 102 can be updated to display the carrier name of the MNO 114, the mobile device 102 can configure the baseband processor 110 to properly communicate with the MNO 114, and so on. At step 410, the main OS 202 activates the eSIM 208 at the mobile device 102. This can involve, for example, issuing a request to the eUICC 108 to load/activate the eSIM 208 within the eUICC 108, thereby enabling the mobile device 102 to establish a connection with the MNO 114 with which the eSIM 208 is associated. In turn, the mobile device 102 can access services provided by the MNO 114.

Figure 5:
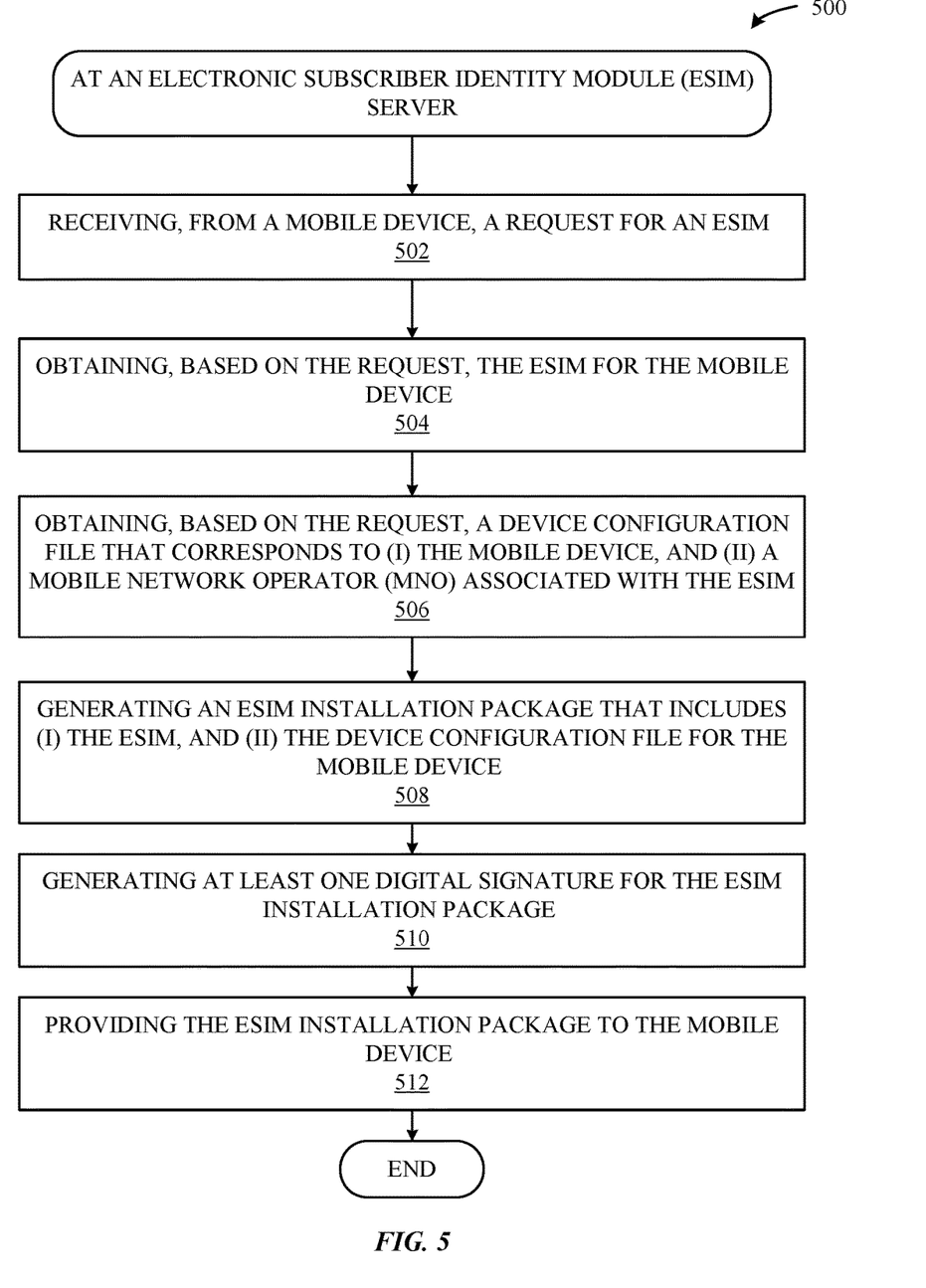
FIG. 5 illustrates a method for providing an eSIM to a mobile device, according to some embodiments.

FIG. 5 illustrates a method 500 for providing an eSIM (e.g., an eSIM 208) to a mobile device (e.g., a mobile device 102), according to some embodiments. As shown in FIG. 5, the method 500 begins at step 502, and involves an eSIM server (e.g., the eSIM server 116) receiving, from the mobile device 102, a request for the eSIM 208. As previously described herein, the request can include, for example, an International Mobile Equipment Identity (IMEI) number associated with the mobile device 102, device type information associated with the mobile device 102, information input by a user of the mobile device 102, information associated with the main OS 202 executing on the mobile device 102, and the like. According to some embodiments, the request can also include information associated with the eSIM 208, e.g., a type of eSIM 208, an MNO 114 associated with the eSIM 208, and so on. It is noted that these examples are not an exhaustive list of what the request can include, and that any form of information can be provided by the mobile device 102 to the eSIM server 116 to facilitate the delivery of an eSIM installation package from the eSIM server 116 to the mobile device 102. At step 504, the eSIM server 116 obtains, based on the request, the eSIM 208 for the mobile device 102.

At step 506, the eSIM server 116 obtains, based on the request, a device configuration file (e.g., a device configuration file 204) that corresponds to (i) the mobile device 102, and (ii) an MNO 114 associated with the eSIM 208. According to some embodiments, the eSIM server 116 can be configured to manage a collection of device configuration files 204 for different mobile devices 102 associated with different OEMs. For example, the eSIM server 116 can analyze hardware identifiers for the mobile device 102 included in the information and reference the hardware identifiers against the collection of device configuration files 204 (e.g., using a database) to identify a device configuration file 204 that is appropriate for the mobile device 102. Additionally, the eSIM server 116 can be configured to interface with an OEM server 118 to dynamically obtain a device configuration file 204 for the mobile device 102. For example, the eSIM server 116 can be configured to analyze the hardware identifiers for the mobile device 102 included in the information and provide the hardware identifiers to the OEM server 118. In turn, the OEM server 118 can respond with the device configuration file 204 that is appropriate for the mobile device 102.

It is noted that different approaches can be used to increase the overall efficiency of the above-described responsibilities of the eSIM server 116 and the OEM server 118. For example, the eSIM server 116 can be configured to cache a collection of device configuration files 204 provided by OEM servers 118, and periodically query the OEM servers 118 for updates, if any, to the device configuration files 204 included in the collection of device configuration files 204. Moreover, the eSIM server 116 can be configured to receive notifications from the OEM servers 118 when updates are made to the device configuration files 204, and update the collection of device configuration files 204 where appropriate. In this manner, the eSIM server 116 can increase the overall efficiency by which the eSIM server 116 is able to respond to the requests for eSIMs 208 issued by the mobile devices 102 while maintaining a substantially up-to-date collection of device configuration files 204.

At step 508, the eSIM server 116 generates an eSIM installation package that includes (i) the eSIM 208, and (ii) the device configuration file 204 for the mobile device 102. At step 510, the eSIM server 116 generates at least one digital signature for the eSIM installation package in accordance with the techniques described above in conjunction with FIG. 3. At step 512, the eSIM server 116 provides the eSIM installation package to the mobile device 102, whereupon the mobile device 102 can verify/install the eSIM 208/the device configuration file 204 in accordance with the techniques described here.

Figure 6:
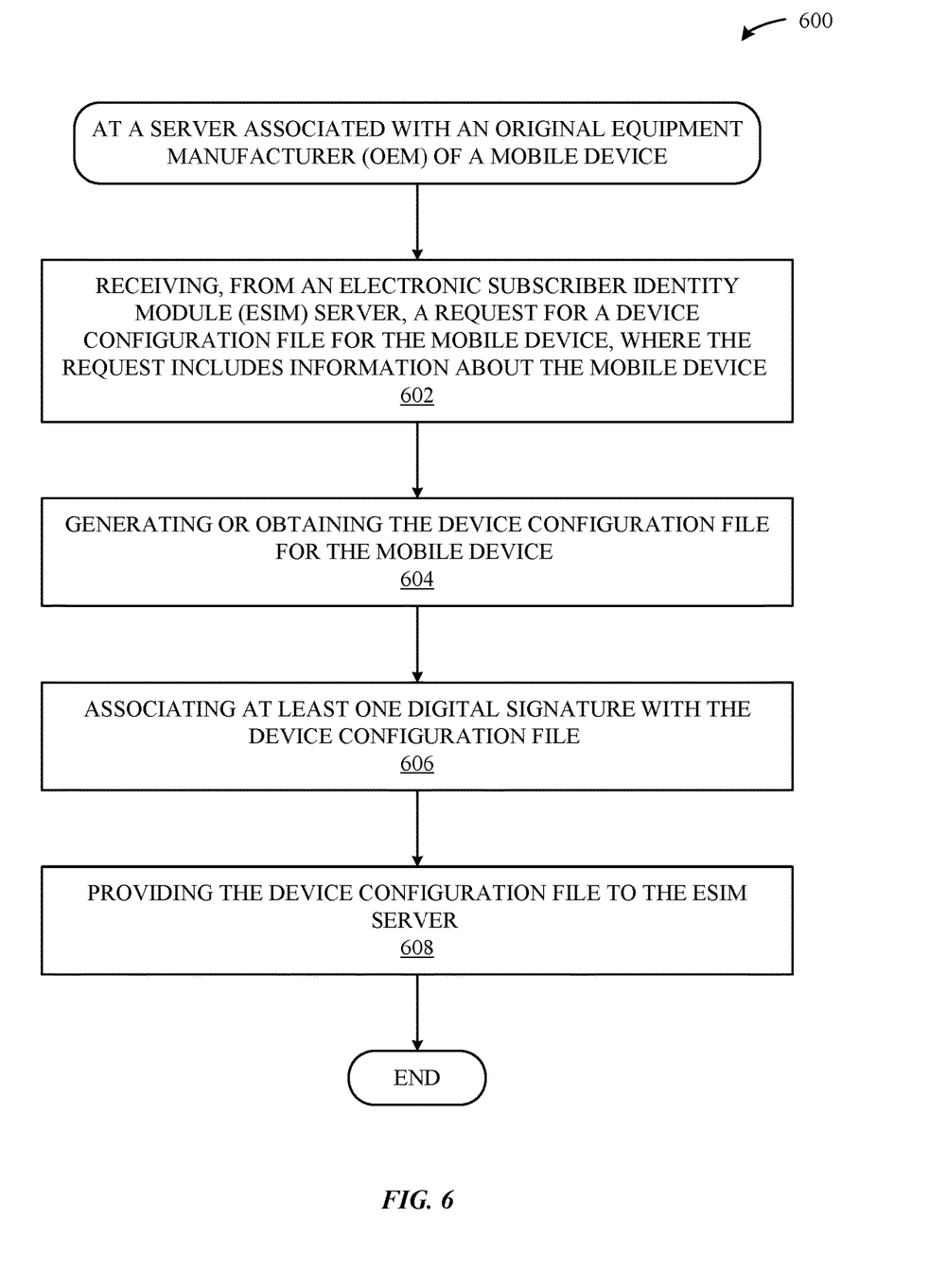
FIG. 6 illustrates a method for dynamically providing a device configuration file to an eSIM server, according to some embodiments.

FIG. 6 illustrates a method 600 for dynamically providing a device configuration file (e.g., a device configuration file 204) to an eSIM server 116, according to some embodiments. As shown in FIG. 6, the method 600 begins at step 602, and involves the OEM server 118 receiving, from the eSIM server 116, a request for a device configuration file 204 for the mobile device 102, where the request includes information (as previously described) about the mobile device 102. At step 604, the OEM server 118 generates or obtains the device configuration file 204 for the mobile device. At step 606, the OEM server 118 associates at least one digital signature with the device configuration file in accordance with the techniques described herein. At step 608, the OEM server 118 provides the device configuration file to the eSIM server 116. It is noted that the techniques described herein do not limit the OEM server 118 to communicating only with eSIM servers 116. According to some embodiments, the mobile devices 102 can be configured to interact directly with both the eSIM servers 116/OEM servers 118 in order to carry out the various techniques described herein.

Figure 7:
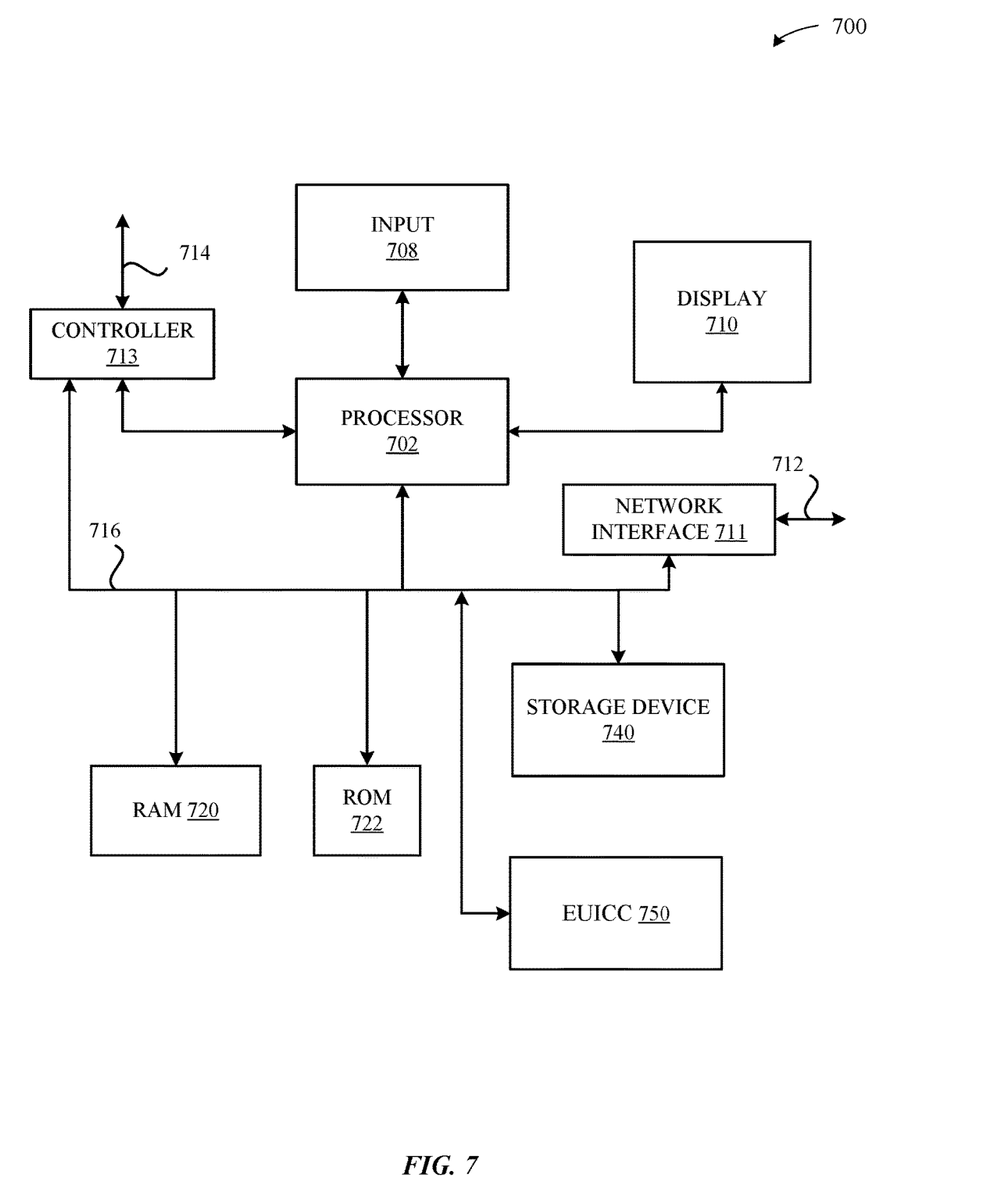
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the computing devices illustrated in FIG. 1 and/or described herein. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include an eUICC 750, which can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for installing an electronic Subscriber Identity Module (eSIM) at a mobile device, the method comprising, at the mobile device:
   receiving a first request to obtain the eSIM;
   issuing, to an eSIM server, a second request for the eSIM;
   receiving an eSIM installation package from the eSIM server, wherein the eSIM installation package includes:
   (i) the eSIM,
   (ii) an encrypted device configuration file that corresponds to the mobile device and at least one Mobile Network Operator (MNO) associated with the eSIM, wherein the encrypted device configuration file is encrypted based on a public key that is specific to the mobile device,
   (iii) a first digital signature; and
   upon verifying the first digital signature included in the eSIM installation package:
   accessing a private key counterpart to the public key, wherein the private key is specific to the mobile device and is pre-loaded into a protected area of memory on the mobile device,
   decrypting the encrypted device configuration file using the private key to produce a decrypted device configuration file,
   installing the decrypted device configuration file on the mobile device, and
   installing the eSIM on an electronic Universal Integrated Circuit Card (eUICC) included in the mobile device.

2. The method of claim 1, wherein the first request is received in conjunction with an initialization of the mobile device.

3. The method of claim 1, wherein the second request includes (i) first information about the mobile device, and (ii) second information about the eSIM.

4. The method of claim 1, wherein:
the first digital signature corresponds to a first hash of (i) the decrypted device configuration file, and (ii) the eSIM, and
the first digital signature is generated by the eSIM server.

5. The method of claim 4, wherein:
the eSIM installation package includes a second digital signature associated with a second hash of the decrypted device configuration file, and
the second digital signature is generated by an Original Equipment Manufacturer (OEM) associated with the mobile device.

6. The method of claim 5, wherein:
the eSIM installation package includes a third digital signature associated with a third hash of the eSIM, and
the third digital signature is generated by the eSIM server.

7. The method of claim 5, further comprising, subsequent to installing the eSIM on the eUICC:
providing, to the eSIM server, an indication that the eSIM is successfully installed on the eUICC.

8. The method of claim 1, further comprising:
activating the decrypted device configuration file and the eSIM at the mobile device; and
utilizing the decrypted device configuration file and the eSIM to access services provided by the at least one MNO.

9. A method for providing an electronic Subscriber Identity Module (eSIM) to a mobile device, the method comprising, at an eSIM server:
receiving, from the mobile device, a request for the eSIM;
obtaining, based on the request, a device configuration file that is separate and distinct from the eSIM, and corresponds to:
the mobile device, and
at least one Mobile Network Operator (MNO) associated with the eSIM;
encrypting the device configuration file using a public key that is specific to the mobile device to produce an encrypted device configuration file, wherein a private key counterpart to the public key is pre-loaded into a protected area of memory on the mobile device that is accessible to the mobile device;
obtaining, based on the request, the eSIM for the mobile device;
generating a first digital signature for the eSIM installation package;
generating an eSIM installation package that includes (i) the eSIM, (ii) encrypted device configuration file for the mobile device, and (iii) the first digital signature; and
providing the eSIM installation package to the mobile device.

10. The method of claim 9, wherein:
the request includes (i) first information about the mobile device, and (ii) second information about the eSIM,
the device configuration file is obtained based on (i) the first information about the mobile device, and
the eSIM is obtained based on (ii) the second information about the eSIM.

11. The method of claim 10, wherein the (i) first information about the mobile device includes one or more of the following:
an International Mobile Equipment Identity (IMEI) number associated with the mobile device,
a device type of the mobile device, or
information input by a user of the mobile device.

12. The method of claim 9, wherein generating the first digital signature for the eSIM installation package comprises:
generating a first hash of (i) the device configuration file, and (ii) the eSIM, and
encrypting the first hash using an eSIM server private key possessed by the eSIM server, wherein the eSIM server private key corresponds to an eSIM server public key that is accessible to the mobile device and trusted by the mobile device.

13. The method of claim 12, wherein:
the device configuration file is associated with a second digital signature that is based on a second hash of the device configuration file, and
the second digital signature is generated by an Original Equipment Manufacturer (OEM) associated with the mobile device.

14. The method of claim 13, further comprising:
generating a third hash of the eSIM, and
encrypting the third hash using the eSIM server private key.

15. The method of claim 9, further comprising:
receiving, from the mobile device, an indication that the eSIM is successfully installed on an electronic Universal Subscriber Identity Module (eUICC) included in the mobile device, and
updating a database to reflect that the eSIM is installed on the eUICC.

16. The method of claim 9, wherein the private key counterpart enables the mobile device to decrypt the encrypted device configuration file to produce a decrypted device configuration file.

17. A mobile device configured to install an electronic Subscriber Identity Module (eSIM), the mobile device comprising:
an electronic Universal Integrated Circuit Card (eUICC); and
a processor configured to cause the mobile device to carry out steps that include:
receiving a first request to obtain the eSIM;
issuing, to an eSIM server, a second request for the eSIM;
receiving an eSIM installation package from the eSIM server, wherein the eSIM installation package includes:
(i) the eSIM,
(ii) an encrypted device configuration file that corresponds to the mobile device and at least one Mobile Network Operator (MNO) associated with the eSIM, wherein the encrypted device configuration file is encrypted based on a public key that is specific to the mobile device, and
(iii) a first digital signature; and
upon verifying the first digital signature included in the eSIM installation package:
accessing a private key counterpart to the public key, wherein the private key is specific to the mobile device and is pre-loaded into a protected area of memory on the mobile device,
decrypting the encrypted device configuration file using the private key to produce a decrypted device configuration file,
installing the decrypted device configuration file on the mobile device, and
installing the eSIM on the eUICC.

18. The mobile device of claim 17, wherein:
the eUICC is a chip that is permanently embedded within a primary system board of the mobile device, or
the eUICC is a chip that can be inserted into and removed from a slot included in the mobile device.

19. The mobile device of claim 17, wherein:
the first digital signature corresponds to a first hash of (i) the decrypted device configuration file, and (ii) the eSIM, and
the first digital signature is generated by the eSIM server.

20. The mobile device of claim 17, wherein the steps further include:
activating the decrypted device configuration file and the eSIM at the mobile device; and
utilizing the decrypted device configuration file and the eSIM to access services provided by the at least one MNO.

* * * * *